Figures 1, 2:
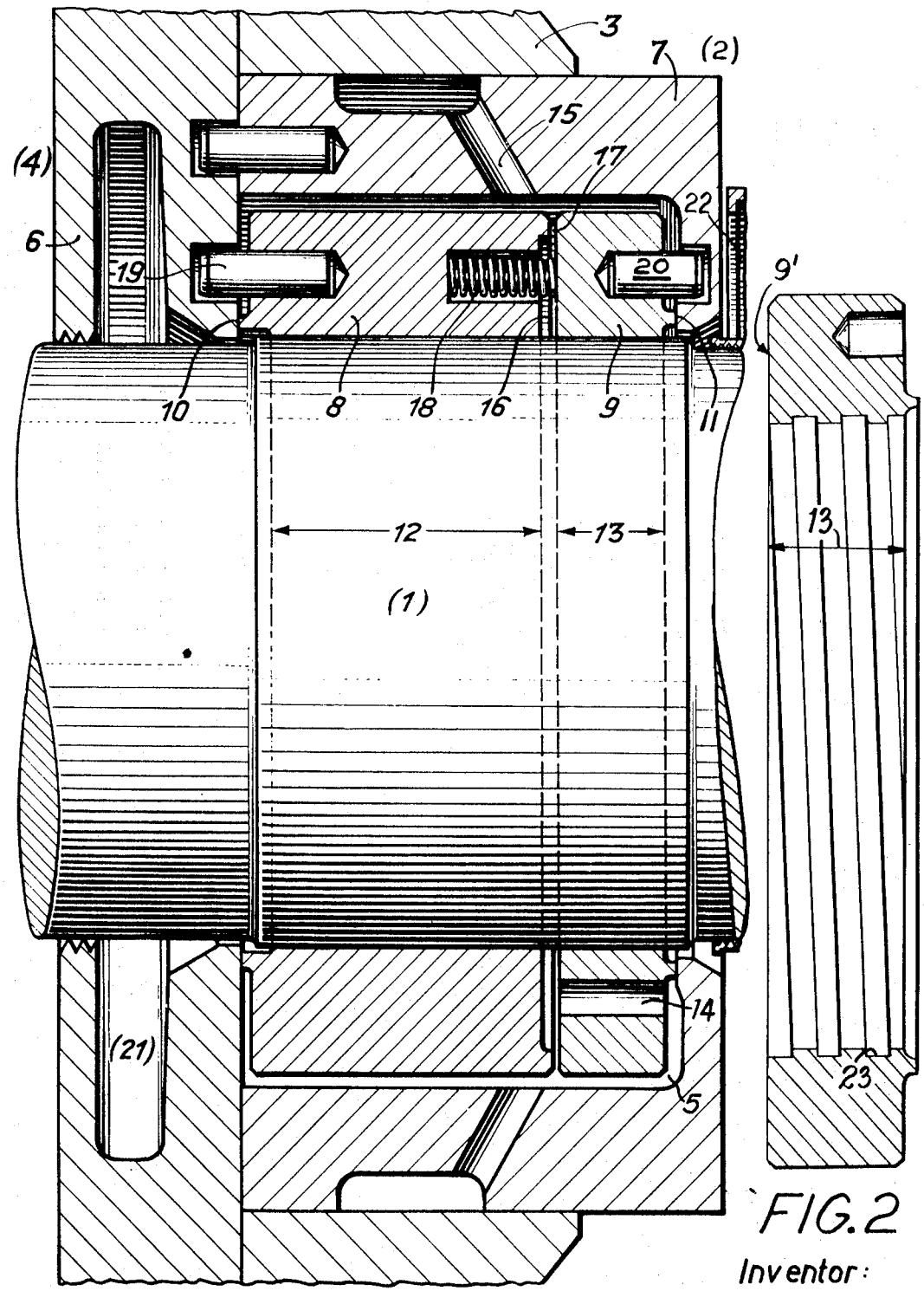

United States Patent

[11] 3,617,068

| [72] | Inventor | Walter Sprenger<br>Wiesendangen, Switzerland |
| --- | --- | --- |
| [21] | Appl. No. | 15,122 |
| [22] | Filed | Feb. 27, 1970 |
| [45] | Patented | Nov. 2, 1971 |
| [73] | Assignee | Brown-Boveri-Sulzer, Turbomachinery Ltd.<br>Zurich, Switzerland |
| [32] | Priority | Feb. 28, 1969 |
| [33] | | Switzerland |
| [31] | | 3015/69 |

[54] FLOATING RING SEAL FOR ROTATING SHAFTS
8 Claims, 2 Drawing Figs.

[52] U.S. Cl. .................................... 277/62,
277/74, 277/75, 277/83, 277/134

[51] Int. Cl. .................................... F16j 9/00,
F16j 15/40

[50] Field of Search ......................... 277/70, 74,
75, 83, 76, 62, 175, 98, 134

[56] References Cited
UNITED STATES PATENTS

| 2,860,895 | 11/1958 | Mosbacher | 277/83 X |
| --- | --- | --- | --- |
| 2,971,783 | 2/1961 | Laser | 277/83 X |
| 3,070,377 | 12/1962 | Eickmann | 277/74 |
| 3,093,382 | 6/1963 | Macks | 277/74 X |
| 3,486,760 | 12/1969 | Tracy | 277/75 X |

Primary Examiner—Samuel B. Rothberg
Attorney—Kenyon & Kenyon Reilly Carr & Chapin ABSTRACT: The two sealing rings are arranged so that substantially all the sealant and coolant medium flows first through the sealing ring on the high-pressure side to dissipate heat therein. The medium then flows into the space between the sealing rings and is distributed into the sealing gaps between the sealing rings and shaft.

PATENTED NOV 2 1971 3,617,068

Inventor:
WALTER SPRENGER
BY
Kenyon & Kenyon Reilly Carr & Chapin
ATTORNEYS

FLOATING RING SEAL FOR ROTATING SHAFTS

This invention relates to a seal for rotating shafts and more particularly to a floating ring seal for rotating shafts.

Seals have been known in which a pair of sealing rings are mounted within a sealing chamber to surround a rotating shaft with slight radial clearances so as to define sealing gaps with the shaft. Generally, the sealing rings have been closely spaced from each other in the zone of the end faces which face each other and have at least one annular part on the opposite end faces which abut against an end face of the sealing chamber. This arrangement enables a barrier flow of a lubricant and coolant to be maintained in a path extending from the space between the sealing rings through both sealing gaps along the shaft.

These heretofore known seals have been used for sealing the shafts of turbomachines for high pressures. Because of their reliability, these seals have also been suitable for machines which conduct gases which may have undesirable effects in the ambient zones or which may represent a hazard to life.

However, it has been found that with high pressures these heretofore seals have allowed heat to be generated in the barrier medium, due, mainly, as a result of hydraulic friction, without being dissipated. This heat is generated mostly on the high-pressure side of the sealing rings and, as a result of excessive temperature rise, causes difficulties therein. For example, only a small quantity of barrier medium can pass through the sealing gap of the high-pressure side ring into the interior of the machine utilizing the seal because the required later separation of the barrier medium introduced into the gas within the machine involves substantial costs. However, the use of a minimum quantity of barrier medium is insufficient to dissipate the heat produced by hydraulic friction in order to prevent a temperature rise beyond a permissible level.

Usually the sealing ring on the low-pressure side is exposed to far less danger than the other sealing ring because a larger quantity of barrier medium is able to flow through the sealing gap thereat. The larger quantity is permitted because the sealing gap on this side is usually larger and because the pressure drop is greater. Also, the barrier medium can be recovered more easily on exiting from this side of the seal. Moreover, the friction losses at the lower pressures are not as great as those resulting from higher pressures so that, altogether, the greater flow rate alone is sufficient to dissipate the less amount of heat thus generated.

Accordingly, it is an object of the invention to efficiently dissipate the heat in a sealing ring on the high-pressure side of a floating ring seal.

It is another object of the invention to utilize substantially the entire barrier medium flow for dissipating the heat in a sealing ring on the high-pressure side of a floating ring seal.

It is another object of the invention to provide a floating ring seal of economical construction which is able to dissipate large quantities of heat.

Briefly, the invention provides a floating ring seal of the type described above for a rotating shaft wherein substantially the entire quantity of barrier medium supplied to a sealing chamber having a pair of sealing rings therein is used to cool the high-pressure side sealing ring.

In one embodiment, the sealing ring which surrounds the shaft on the high-pressure side is provided with means, such as axial ports, disposed near the sealing gap for directing substantially the entire quantity of barrier medium supplied to the sealing rings from the chamber housing the rings through the ring. The barrier medium flow in passing through the ring on the high-pressure side is, thus, able to cool the ring by dissipating the heat generated by hydraulic friction in the sealing gap of the ring.

In operation, the barrier medium which is supplied into the chamber is at a higher pressure than the medium to be sealed and is first employed to cool the ring on the high-pressure side. The heat generated in this ring is thus distributed over a substantially large part of the barrier medium so that the temperature of the ring is correspondingly reduced. Thereafter, a portion of the barrier medium is directed through the sealing gap between the high-pressure side ring and shaft without being stressed under a large thermal load such that the temperature does not rise excessively. The remaining larger portion of the barrier medium is directed through the sealing gap defined by the other sealing ring and the shaft.

In another embodiment, the high-pressure side sealing ring can be made of porous material, such as a porous metal, with pores which form passageways through the sealing ring for the flow of the barrier medium through the sealing ring.

The sealing rings are further biased away from each other against the sides of the sealing chamber by means of axially acting springs so as to more effectively seal the rings against the sides of the sealing chamber. Also, rotation of the floating sealing rings around the shaft relative to the sealing chamber is prevented by any suitable means which provides for radial and axial slack. To this end, pins can be fixed in each ring and loosely received in the sides of the sealing chamber.

These and other objects and advantages of the invention will become more apparent when taken in conjunction with the accompanying drawing in which:

FIG. 1 illustrates a cross-sectional view of a seal according to the invention; and FIG. 2 illustrates a cross-sectional view of a porous sealing ring according to the invention.

Referring to FIG. 1, a shaft 1 of a machine extends from an internal chamber 2 of the machine through a housing 3 into a space 4 surrounding the machine housing 3. The internal chamber 2, for example, contains a gas under high pressure which may serve as a turbine driving medium or which may require compression as a medium to be utilized. The surrounding space 4 can, for example, be exposed to a surrounding atmosphere in which personnel are present. Accordingly, a seal is used to ensure that practically no gas can escape from the internal chamber 2 along the shaft 1 to the space 4.

The seal includes a means which defines an annular sealing chamber 5. This means can be formed by a sealing flange 6 which is disposed in sealing relation about the shaft 1 adjacent to the housing 3 and a sleeve 7 which passes through the housing 3 to abut the sealing flange at one end while having a radially inwardly directed flange at the opposite end. In addition, the seal includes a pair of sealing rings 8, 9 which are disposed in the sealing chamber 5 with diametric clearances from the shaft 1. The ring 8 on the low-pressure low-pressure side has a slightly larger diameter clearance (approximately 0.18 to 0.25 mm. for a shaft diameter of 125 mm.) than the ring 9 on the high-pressure side (approximately 0.12 to 0.17 mm.). The combined axial length of the two rings 8, 9 is shorter by approximately one-half millimeter (0.50 mm.) or even less than the distance between the two internal end faces or sides 10, 11 of the sealing chamber 5. Thus, when the ring 8 bears against the end face 10 and the ring 9 bears against the end face 11, a very slight clearance remains between the rings 8, 9; the diametric clearance of the rings 8, 9 relative to the shaft being smaller. In addition, as shown, the sealing ring 8 on the low-pressure side has a recessed face facing the other sealing ring 9 so as to form a space 16 therebetween for receiving a barrier medium.

In order to maintain the pressure of a barrier medium in the space 16, the axial length 12 of the sealing surface of the sealing ring 8 is greater than the axial length 13 of the sealing surface of the ring 9 on the high-pressure side.

The sealing rings 8, 9 are each provided with at least one annular part on the external end faces which abut the end faces 10, 11 of the sealing chamber 5 so as to seal off any flow of barrier medium between the seal rings 8, 9 and sealing chamber end faces 10, 11. In addition, a plurality of axially acting springs 18 are recessed into the internal end face of the sealing ring 8 to bias the rings 8, 9 apart from each other and against the end faces 10, 11 even when the system is not in operation.

In order to introduce a barrier medium, such as a sealant and coolant medium, or a barrier medium and coolant medium, into the sealing chamber 5, the sleeve 7 is provided with an inlet port 15 in an annular port 17 which communicates via a manifold with a supply (not shown) of barrier medium.

In order to direct the delivered barrier medium through the sealing ring 9, a large number (approximately 10 to 20 or more) of axial ports or bores 14 are uniformly distributed over the circumference of the ring 9. These ports 14 serve to direct substantially all the barrier medium from the inlet port 15 and sealing chamber 5 through the ring 9 into the space 16 between the rings 8, 9. Only an insignificant quantity of the barrier medium can enter directly into the space 16 without passing through the ports 14 since the axial clearance between the rings 8, 9 is small.

In order to prevent rotation of the sealing rings 8, 9, pins 19, 20 are press fit at one end into the rings 8, 9 respectively, and are received at the other end in suitable bores in the sealing flange 6 or sleeve 7 to permit axial and radial slack. A slight clearance in the circumferential and radial directions thus remain for the rings 8, 9 to allow the rings 8, 9 to follow small motions of the shaft 1 in the radial direction without obstruction.

In use, the absolute pressure of the barrier medium supplied to the seal system must be greater than the highest absolute pressure which prevails in the internal chamber 2. The positive pressure of the barrier medium, exceeding the pressure difference between internal and external chamber, may for example amount to one-half atmosphere or even more. In this way, the barrier medium flows from the sealing chamber 5 through the apertures 14 into the space 16. A smaller proportion of the barrier medium—corresponding to the smaller amount of slack and the smaller pressure difference—flows from the space 16 between the ring 9 and the shaft 1 towards the internal chamber 2. This flow of sealing medium prevents any discharge of gas from the chamber 2 relative to the space 16 and therefore prevents escape into the external space 4. A greater proportion of the sealing medium flows from the space 16, in accordance with the higher pressure difference and greater clearance, along the shaft towards the external space 4. The amounts of barrier medium discharged on both sides of the seal are of course collected in collecting chambers 21, 22 on the low-pressure side and on the high-pressure side. By appropriate choice of the radial clearance between the two rings 8, 9 and the sealing length as well as of the positive pressure of the barrier medium, it is possible to provide suitable conditions to enable an absolutely reliable sealing effect to be maintained. Thus, the increases amount of heat generated on the high-pressure side due to the increased thermal loading, can be reliably dissipated by the barrier medium which flows through the apertures 14.

Referring to FIG. 2, wherein like reference characters indicate like parts as above, the sealing surface of the high-pressure side sealing ring 9' which is to surround a shaft is provided with coaxial, helically curved grooves 23 whose direction of pitch is so selected that a force, acting in the direction of the space between the rings is exerted upon the film of barrier medium in the sealing gap between the ring 9' and shaft when the shaft is rotating. Also, instead of providing the ring 9' with ports 14, as above, the ring 9' is constructed of porous metal. In this case, the pores communicate with each other in the axial direction to provide a large number of individual fine passageways capable of allowing the entire quantity of barrier medium to flow through with a pressure drop which is not excessive. The heat exchanger surface area is thus substantially increased, for example, by a multiple, so that the heat thus developed is absorbed more rapidly and any excessive temperature rise is safely avoided.

The seal according to the invention can be employed for turbines and compressors, particularly in nuclear power stations, as well as for apparatus and process equipment of the chemical industry and other processing industries, for example, for the shafts of agitators.

It is also noted that the clearances between rings and shaft, and the axial clearance between rings must adapt themselves to the kind and pressure of the gas, the diameter of the shaft, the rotational shaft speed and therefore the circumferential speed to provide optimum sealing with permissible heat generation and temperature.

What is claimed is:

1. A seal for rotating shaft comprising
    means defining an annular chamber and an inlet port for the introduction of a barrier medium into said chamber; and
    a pair of closely spaced sealing rings disposed within said chamber for surrounding the shaft with respective radial clearances to form respective sealing gaps therebetween, said sealing rings being closely spaced to define a space therebetween in communication with said sealing gaps, each said sealing ring bearing with at least one annular part of an endface facing away from the other of said sealing rings against said means defining said chamber, one of said sealing rings having means therein on one side of said annular part thereof for directing the barrier medium from said inlet port through said one sealing ring into said space between said rings to cool said one sealing ring whereby heat generated by hydraulic friction in said sealing gap defined by said one sealing ring is dissipated.

2. A seal as set forth in claim 1 wherein said means for directing the barrier medium through said one sealing ring comprises a plurality of axial ports passing through said one sealing ring.

3. A seal as set forth in claim 1 wherein said one sealing ring is of porous material with passageways therein forming said means for directing the barrier medium through said one sealing ring.

4. A seal as set forth in claim 1 which further comprises a plurality of axially acting springs between said sealing rings biasing said sealing rings apart and against said means defining said chamber.

5. A seal as set forth in claim 1 which further comprises means for preventing rotation of said sealing rings relative to said means defining said chamber.

6. A seal as set forth in claim 5 wherein said means for preventing rotation include a plurality of pins secured in each sealing ring and extending into said means defining said chamber with axial and radial clearance to permit slight axial and radial movement of said sealing rings relative to said latter means.

7. A seal as set forth in claim 1 wherein said one sealing ring includes coaxial helically curved grooves in the inner circumferential surface having a direction of pitch to exert a force in the direction of said space between said sealing rings on a film of the barrier medium in said sealing gap defined by said one sealing ring when the shaft is rotating.

8. A seal as set forth in claim 1 wherein said means defining said chamber includes a sleeve having a radially inwardly directed flange at one end abutting said annular part of one sealing ring and a sealing flange abutting said sleeve opposite said flange and abutting the other sealing ring.

* * * * *